US009958683B2

(12) United States Patent
Takagi et al.

(10) Patent No.: US 9,958,683 B2
(45) Date of Patent: May 1, 2018

(54) LIGHT GUIDE DEVICE, VIRTUAL IMAGE DISPLAY APPARATUS, AND METHOD FOR MANUFACTURING LIGHT GUIDE DEVICE

(71) Applicant: SEIKO EPSON CORPORATION, Tokyo (JP)

(72) Inventors: Masayuki Takagi, Matsumoto (JP); Toshiaki Miyao, Matsumoto (JP); Takahiro Totani, Suwa (JP); Takashi Takeda, Suwa (JP); Akira Komatsu, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/459,390

(22) Filed: Mar. 15, 2017

(65) Prior Publication Data

US 2017/0184859 A1    Jun. 29, 2017

Related U.S. Application Data

(63) Continuation of application No. 14/561,976, filed on Dec. 5, 2014, now Pat. No. 9,632,310.

(30) Foreign Application Priority Data

Dec. 24, 2013 (JP) ................. 2013-265008

(51) Int. Cl.
| | | |
|---|---|---|
| G02B 25/00 | (2006.01) | |
| G02B 27/01 | (2006.01) | |
| G02B 1/14 | (2015.01) | |
| F21V 8/00 | (2006.01) | |

(52) U.S. Cl.
CPC ........... *G02B 27/0172* (2013.01); *G02B 1/14* (2015.01); *G02B 6/0048* (2013.01); *G02B 2027/013* (2013.01); *G02B 2027/0125* (2013.01); *G02B 2027/0178* (2013.01)

(58) Field of Classification Search
CPC ................................................ G02B 27/0006
USPC ....................................... 359/643, 630, 631
See application file for complete search history.

(56) References Cited

U.S. PATENT DOCUMENTS

| | | | |
|---|---|---|---|
| 2013/0222896 A1* | 8/2013 | Komatsu ............ | G02B 17/0848 359/365 |
| 2014/0139927 A1 | 5/2014 | Hiraide | |
| 2016/0154245 A1 | 6/2016 | Gao et al. | |

FOREIGN PATENT DOCUMENTS

JP    2013-073187 A    4/2013

OTHER PUBLICATIONS

Aug. 10, 2016 Office Action issued in U.S Appl. No. 14/561,976.

* cited by examiner

*Primary Examiner* — James Jones
(74) *Attorney, Agent, or Firm* — Oliff PLC (57) ABSTRACT

In a light guide device, a step between optical surfaces connected to each other by a connection portion can be limited (e.g., to 1 mm or smaller) so that a large stepped portion is not allowed to be formed at the connection portion in a hard coat formation process, whereby a coating liquid that flows along portions that are to form the optical surfaces forms no liquid pool or causes no liquid sagging. The light guide device can thus maintain satisfactory light guiding performance at the light guide portion.

12 Claims, 7 Drawing Sheets

LIGHT GUIDE DEVICE, VIRTUAL IMAGE DISPLAY APPARATUS, AND METHOD FOR MANUFACTURING LIGHT GUIDE DEVICE

This is a Continuation of U.S. application Ser. No. 14/561,976 filed Dec. 5, 2014, which claims priority to Japanese Patent Application No. 2013-265008 (filed Dec. 24, 2013). The disclosure of the prior application is hereby incorporated by reference herein in its entirety.

BACKGROUND

1. Technical Field

The present invention relates, for example, to a light guide device that guides video image light to present a viewer with video images formed, for example, by an image display device, and particularly to a light guide device suitable for a head-mounted display worn around the viewer's head, a virtual image display apparatus using the light guide device, and a method for manufacturing the light guide device.

2. Related Art

A variety of optical systems incorporated in a virtual image display apparatus, such as a head-mounted display (hereinafter also referred to as HMD) worn around a viewer's head, have been proposed (see JP-A-2013-73187, for example).

In a virtual image display apparatus of this type, to guide image light in an appropriate state, it is necessary to keep a satisfactory state of a surface portion of a light guide plate that allows propagation of the image light through reflection or any other optical phenomenon. It is therefore conceivable to provide a hard coat layer to prevent damage to the surface portion and allow dirt on the surface to be readily removed. For example, to superimpose the image light (video image light) and outside light on each other, a see-through-type optical system has been proposed (see JP-A-2013-73187, for example). In a see-through-type HMD of this type, it is important to provide a hard coat that substantially prevents scratches and dirt on the light guide plate or any other light guide portion that is handled as an exterior part.

The light guide plate or any other light guide portion, however, typically has a complicated shape in many cases, and fully coating the light guide portion is not always readily performed. For example, when the light guide plate is formed of a plurality of complicated curved surfaces, it is conceivable that a coating liquid solution undesirably flows in such a way that it converges to a single point of the light guide portion in a coating process, resulting in a large amount of liquid drooping on the surface or hard coat failure. Further, for example, in a coating process using dipping operation, presence of a stepped surface substantially perpendicular to the lift-up direction in the dipping operation conceivably causes the coat liquid solution to build up on the stepped surface, resulting in liquid drooping. In particular, a stepped portion tends to be formed between a plurality of surfaces that form a light guide portion, and it is not always easy in this case to prevent the coating liquid from drooping but appropriately form a hard coat layer.

SUMMARY

An advantage of some aspects of the invention is to provide a light guide device that allows a protective hard coat layer to be provided thereon and satisfactory light guide performance at a light guide portion to be maintained, a virtual image display apparatus using the light guide device, and a method for manufacturing the light guide device.

A light guide device according to an aspect of the invention includes a light guide member that has a plurality of optical surfaces including a nonaxisymmetric curved surface, introduces video image light into the light guide device, and guides the video image light through internal reflection to cause the video image light to exit out of the light guide device and a hard coat layer that is formed in a coating liquid application process and forms a surface portion that forms at least part of the plurality of optical surfaces of the light guide member. The light guide member has a connection portion that connects, among the plurality of optical surfaces, a first optical surface and a second optical surface to each other, and the connection portion provides a non-uniform height difference between the first optical surface and the second optical surface.

Each of the optical surfaces is a surface having an optical function in the light guide member and means a surface that guides light through internal reflection, a light incident surface on which light is allowed to be incident, and a light exiting surface through which light is allowed to exit.

In the light guide device, the connection portion connects two optical surfaces to each other of the unitary light guide member and provides a non-uniform height difference between the two optical surfaces. In this case, for example, a large stepped portion is not allowed to be formed at the connection portion in the hard coat formation process. The thus formed step prevents the coating liquid that flows along portions that are to form the two optical surfaces from forming a liquid pool or causing liquid sagging, whereby satisfactory light guiding performance at the light guide portion can be maintained.

In a specific aspect of the invention, the first optical surface and the second optical surface are adjacent to each other with a step having a size of 1 mm or smaller therebetween. In this case, limiting the size of the step between the two optical surfaces that the connection portion connects to each other prevents the coating liquid from forming a liquid pool.

In another aspect of the invention, the connection portion has a connection surface that continuously connects the first optical surface and the second optical surface to each other.

In still another aspect of the invention, the connection surface is connected to each of the first optical surface and the second optical surface at an angle greater than or equal to 120°. In this case, in the region from the first optical surface to the second optical surface, no stepped portion is formed at an acute angle with respect to the optical surfaces, whereby liquid drooping is suppressed.

In still another aspect of the invention, the connection surface is a curved surface that smoothly connects the first optical surface and the second optical surface to each other. In this case, in the region from the first optical surface to the second optical surface, formation of a convex portion or any other portion where a liquid pool tends to be formed can be avoided, whereby liquid drooping can be suppressed.

In still another aspect of the invention, the connection surface includes a curved surface portion having a radius of curvature of 1 mm or greater. In this case, in the region from the first optical surface to the second optical surface, a surface having sharp curvature is formed between the connection surface and each of the optical surfaces, whereby liquid drooping can be effectively suppressed.

In still another aspect of the invention, a first connection line that is the boundary between the connection portion and the first optical surface and a second connection line that is the boundary between the connection portion and the second optical surface have no inflection point. In this case, since the connection lines are so shaped that they have no inflection point, the tendency of local build-up of the coating liquid at the boundary between each of the optical surfaces and the connection portion can be lowered, and hence liquid drooping can be suppressed.

In still another aspect of the invention, a first connection line that is the boundary between the connection portion and the first optical surface and a second connection line that is the boundary between the connection portion and the second optical surface each have a linear shape. In this case, since each of the connection lines has a linear shape, the tendency of local build-up of the coating liquid at the boundary between each of the optical surfaces and the connection portion can be lowered, and hence liquid drooping can be suppressed.

In still another aspect of the invention, the light guide member has at least two nonaxisymmetric curved surfaces as the plurality of optical surfaces and serves as part of an optical system to form an intermediate image. In this case, employing a configuration in which an intermediate image is formed allows the light guide device to be compact and to form an image having a wide angle of view.

In still another aspect of the invention, in the light guide member, a first surface and a third surface among the plurality of optical surfaces are so disposed that the first surface and the third surface face each other. The video image light from a video image device is reflected off the third surface, is reflected off the first surface, is reflected off a second surface, then passes through the first surface, and reaches an observation side. One of the first surface to the third surface is the first optical surface or the second optical surface.

In still another aspect of the invention, the light guide member has at least five surfaces as the plurality of optical surfaces, and at least three surfaces of the plurality of optical surfaces are nonaxisymmetric curved surfaces. In this case, since the degree of freedom in optical design increases, a high-quality image can be formed.

In still another aspect of the invention, the light guide device further includes a light transmissive member that is bonded to the light guide member and allows visual recognition of outside light and the video image light superimposed on each other. In this case, a see-through-type optical system that allows the video image light to be superimposed on outside light can be formed.

A virtual image display apparatus according to an aspect of the invention includes a video image device that generates video image light and any of the light guide devices described above that guides the video image light from the video image device through internal reflection.

In the virtual image display apparatus, using the light guide device that suppresses liquid drooping as described above allows formation of a satisfactory image.

A method for manufacturing a light guide device according to an aspect of the invention is a method for manufacturing a light guide device including a light guide member that has a plurality of optical surfaces including a nonaxisymmetric curved surface, introduces video image light into the light guide device, and guides the video image light through internal reflection to cause the video image light to exit out of the light guide device and a hard coat layer that is formed in a coating liquid application process and forms a surface portion that forms at least part of the plurality of optical surfaces of the light guide member, the light guide member having a connection portion that connects, among the plurality of optical surfaces, a first optical surface and a second optical surface to each other, and the connection portion providing a non-uniform height difference between the first optical surface and the second optical surface, the method including a coating liquid application step of applying a coating liquid that is to form the hard coat layer onto a substrate that is to form the light guide device and a layer formation step of forming, based on the coating liquid applied onto a surface of the substrate in the coating liquid application step, the hard coat layer on a surface portion of the substrate that includes a portion that is to form a portion from the first optical surface to the second optical surface.

In the method for manufacturing a light guide device described above, in the manufactured light guide device, the connection portion connects two optical surfaces to each other and provides a non-uniform height difference between the two optical surfaces. In this case, for example, a large stepped portion is not allowed to be formed at the connection portion. In other words, a liquid pool where the coating liquid applied onto the surface of the substrate in the coating liquid application step builds up is unlikely formed. As a result, liquid sagging is suppressed in the layer formation step, whereby the light guide device can be so manufactured that satisfactory light guiding performance at the light guide portion is maintained.

In a specific aspect of the invention, the first optical surface and the second optical surface are adjacent to each other with a step having a size of 1 mm or smaller therebetween. In this case, limiting the size of the step between the two optical surfaces that the connection portion connects to each other prevents the coating liquid from forming a liquid pool in the coating liquid application step.

In another aspect of the invention, in the coating liquid application step, the substrate is so placed that a surface that is to form the first optical surface is disposed above a portion that is to form the connection portion in a gravitational direction and a surface that is to form the second optical surface is disposed below the portion that is to form the connection portion in the gravitational direction. In this case, the coating liquid tends to flow as a whole under gravity from the surface that is to form the first optical surface via the portion that is to form the connection portion toward the surface that is to form the second optical surface. In this process, since formation of the connection portion prevents formation of a liquid pool, the coating liquid having flowing from above, that is, from the first optical surface will not cause liquid drooping on the second optical surface in the layer formation step.

In still another aspect of the invention, in the coating liquid application step, the coating liquid is applied in a dipping process. In this case, even when the substrate on which the hard coat layer is formed has a complicated shape, the hard coat layer can be reliably and uniformly formed in the layer formation step.

BRIEF DESCRIPTION OF THE DRAWINGS

The invention will be described with reference to the accompanying drawings, wherein like numbers reference like elements.

FIG. 3A is a perspective view showing an example of the shape of a connection portion between a first optical surface and a second optical surface of a light guide member. FIG.

3B is an enlarged view of part of FIG. 3A.

DESCRIPTION OF EXEMPLARY EMBODIMENTS

A light guide device and a virtual image display apparatus including the light guide device according to an embodiment of the invention will be described below in detail with reference to FIG. 1 and other figures.

Figure 1:
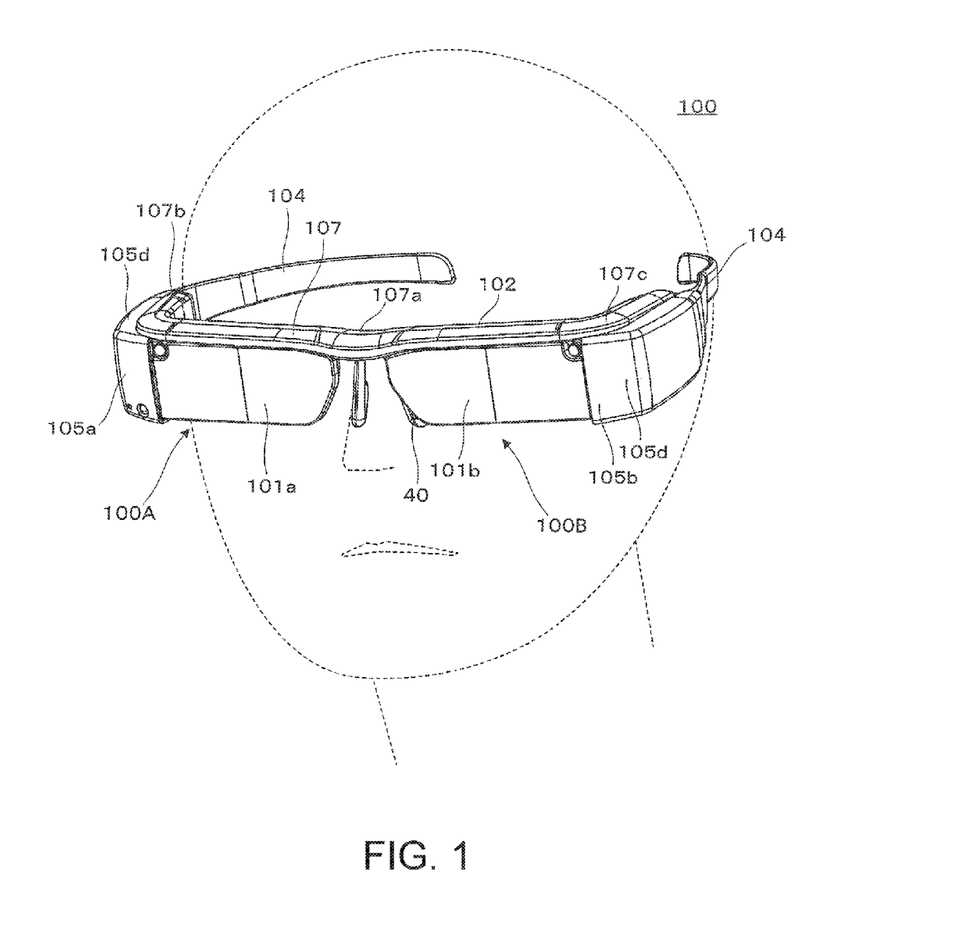
FIG. 1 is a perspective view for briefly describing the exterior appearance of a virtual image display apparatus that is an embodiment of the invention.

A virtual image display apparatus 100 including a light guide device according to the present embodiment is a head-mounted display having a glasses-like exterior appearance as shown in FIG. 1 and allows a viewer or a user who wears the virtual image display apparatus 100 not only to visually recognize image light (video image light) in the form of a virtual image but also to experience see-through visual recognition or observation of an image formed by outside light. The virtual image display apparatus 100 includes first and second optical members 101a, 101b, which cover areas in front of the viewer's eyes in such a way that the optical members allow see-through observation, a frame unit 102, which supports the optical members 101a and 101b, and first and second image formation main body portions 105a, 105b, which are added to portions extending rearward from the right and left ends of the frame unit 102 to sidepiece portions (temples) 104. A first display unit 100A, which is a combination of the first optical member 101a and the first image formation main body portion 105a on the left side in FIG. 1, is a portion that forms a virtual image for the right eye and functions by itself as a virtual image display apparatus. Similarly, a second display unit 100B, which is a combination of the second optical member 101b and the second image formation main body portion 105b on the right side in FIG. 1, is a portion that forms a virtual image for the left eye and functions by itself as a virtual image display apparatus.

Figure 2:
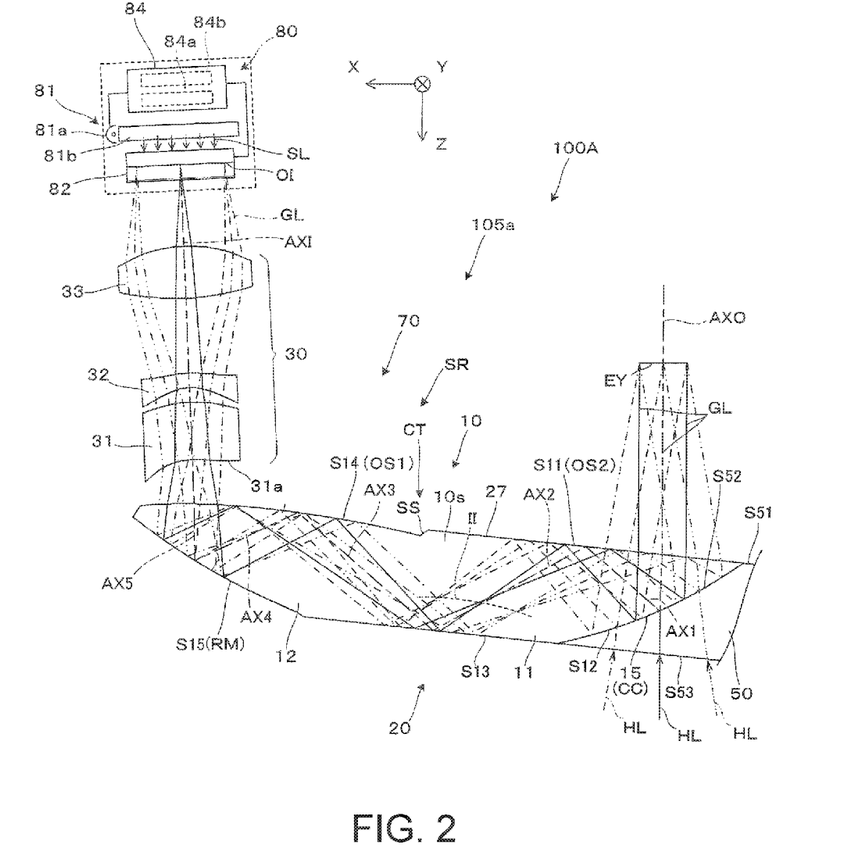
FIG. 2 is a cross-sectional plan view of a main body portion that forms the virtual image display apparatus.

The frame unit 102 provided in the virtual image display apparatus 100 has a frame 107 disposed on the upper side but has no frame-shaped portion on the lower side, as shown in FIGS. 1 and 2. The frame 107, which forms the frame unit 102, is an elongated plate-shaped member having a U-like-bent shape in an XZ plane and includes a front portion 107a extending rightward and leftward in the lateral direction (X direction) and a pair of side portions 107b and 107c extending forward and rearward in the depth direction (Z direction). The frame 107, that is, the front portion 107a and the side portions 107b and 107c form a metal integrated part made of aluminum or any of other variety of metal materials and formed in a die-cast process. The width of the front portion 107a in the depth direction (Z direction) is sufficiently greater than the thickness or width of a light guide device 20 corresponding to the first and second optical members 101a, 101b. The first optical member 101a and the first image formation main body portion 105a, which are aligned with each other, are directly fixed to and supported by a left-side portion of the frame 107, specifically, a portion extending from the left end of the front portion 107a in a front view to the side portion 107b, with screws or any other fasteners. Similarly, the second optical member 101b and the second image formation main body portion 105b, which are aligned with each other, are directly fixed to and supported by a right-side portion of the frame 107, specifically, a portion extending from the right end of the front portion 107a in a front view to the side portion 107c, with screws or any other fasteners. It is noted that the first optical member 101a and the first image formation main body portion 105a are aligned with each other based on fitting connection, and that the second optical member 101b and the second image formation main body portion 105b are aligned with each other based on fitting connection.

The frame 107 has a role not only in supporting the first and second image formation main body portions 105a, 105b but also, in cooperation with cover-shaped exterior members 105d, which cover the first and second image formation main body portions 105a, 105b, in protecting the interior of the first and second image formation main body portions 105a, 105b. The frame 107 is separate from or weakly in contact with an upper portion of the light guide device 20, unlike root portions thereof connected to the first and second image formation main body portions 105a, 105b. Therefore, even when the light guide device 20, which is located at the center, and the frame unit 102, which includes the frame 107, differ from each other in terms of the coefficient of thermal expansion, the light guide device 20 is allowed to expand in the frame unit 102, whereby no distortion, deformation, or breakage of the light guide device 20 will occur.

A nose pad 40 is provided and attached to the frame 107. The nose pad 40, which comes into contact with the viewer's nose, has a role of supporting the frame unit 102. That is, the frame unit 102 is disposed in front of the viewer's face with the aid of the nose pad 40, which is supported by the nose, and the pair of temples 104, which are supported by the ears. The nose pad 40 is fixed with screws to the front portion 107a of the frame 107, which is one of the components that form the frame unit 102. The exterior appearance described above with reference to FIG. 1 is presented by way of example, and part of the mechanisms and other portions fixed with screws or any other fasteners, specifically, mechanisms and other portions that are not directly involved in optical performance can be changed as appropriate in terms of design.

The first display unit 100A can be taken as a device including a projection and see-through section 70, which is a projection system, and an image display section 80, which forms video image light, as shown in FIG. 2. The projection and see-through section 70 has a role in projecting an image formed by the first image formation main body portion 105a in the form of a virtual image onto the viewer's eye. The projection and see-through section 70 includes a light guide member 10 for light guidance and see-through observation, a light transmissive member 50 for see-through observation, and a projection lens 30 for image formation. That is, the first optical member 101a or the light guide device 20 is formed of the light guide member 10 and the light transmissive member 50, and the first image formation main body portion 105a is formed of the image display section 80 and the projection lens 30.

The image display section 80 and the projection lens 30, which form the first image formation main body portion 105*a* (see FIG. 1), will be described below with reference to FIG. 2.

The image display section 80 includes an illuminator 81, which outputs illumination light, a video image display device 82, which is a transmissive spatial light modulator, and a drive controller 84, which controls the operation of the illuminator 81 and the video image display deice 82.

The illuminator 81 in the image display section 80 includes a light source 81*a*, which emits light containing three color light fluxes, or red, green, and blue light fluxes, and a backlight guide 81*b*, which diffuses the light from the light source into a light flux having a rectangular cross-sectional shape. The video image display device (video image device) 82 is formed, for example, of a liquid crystal display device that is formed of a plurality of pixels and spatially modulates the illumination light from the illuminator 81 to form image light to be displayed, such as motion images. The drive controller 84 includes a light source drive circuit 84*a* and a liquid crystal drive circuit 84*b*. The light source drive circuit 84*a* supplies the illuminator 81 with electric power to allow the illuminator 81 to emit illumination light having stable luminance. The liquid crystal drive circuit 84*b* outputs an image signal or a drive signal to the video image display device (video image device) 82 to cause it to form color video image light or color image light in the form of a transmittance pattern based on which motion images or still images are formed. An image processing capability can be added to the liquid crystal drive circuit 84*b*, or an external control circuit with an image processing capability can be provided.

The projection lens 30 is a projection system including three optical elements (lenses) 31 to 33 as constituent elements arranged along a light-incident-side optical axis AXI, and the projection lens further includes a lens barrel (not shown) that accommodates and supports the optical elements 31 to 33. Each of the optical elements 31 to 33 is an aspheric lens having an aspheric surface that is not axially symmetric (nonaxisymmetric aspheric surface) and an aspheric surface that is axially symmetric (axisymmetric aspheric surface) and cooperates with part of the light guide member 10 to form an intermediate image corresponding to an image displayed on the video image display device 82 in the light guide member 10. Among the lenses (optical elements) 31 to 33, the first lens 31 has a lens surface 31*a*, which is the light-exiting surface and is a nonaxisymmetric aspheric surface, and the lens surfaces other than the lens surface 31*a* are axisymmetric aspheric surfaces.

The projection and see-through section 70 and other components will be described below. In the projection and see-through section 70, the light guide member 10, which is part of the prism-shaped light guide device 20 and is an integral member, has a linear central portion (portion in front of eye) close to the nose in a plan view. In the light guide member 10, a first light guide portion 11 is disposed in a portion close to the center or the nose, that is, a portion on the light exiting side and has a first surface S11, a second surface S12, and a third surface S13 as side surfaces having optical functions, and a second light guide portion 12 is disposed in the periphery away from the nose, that is, on the light incident side and has a fourth surface S14 and a fifth surface S15 as side surfaces having optical functions. Among the surfaces, the first surface S11 and the fourth surface S14 are continuously adjacent to each other, and the third surface S13 and the fifth surface S15 are continuously adjacent to each other. The second surface S12 is disposed between the first surface S11 and the third surface S13, and the fourth surface S14 and the fifth surface S15 are adjacent to each other with a large angle therebetween. Further, in the embodiment, the first surface S11 and the third surface S13, which face each other, are flat and substantially parallel to each other. On the other hand, the other surfaces having optical functions, that is, each of the second surface S12, the fourth surface S14, and the fifth surface S15 is a nonaxisymmetric curved surface (free-form surface).

A portion that connects optical surfaces, such as the first surface S11, to each other, will now be described. Particularly in the present embodiment, the light guide member 10, which is an integral member that forms the light guide device 20 and has two optical surfaces adjacent to each other, a first optical surface OS1, which is located in a position relatively shifted toward the light incident side, and a second optical surface OS2, which is located in a position relatively shifted toward the light exiting side, and further has a connection portion CT, which connects the first optical surface OS1 and the second optical surface OS2 to each other. In FIG. 2, among the plurality of optical surfaces that form the light guide member 10, the fourth surface S14 corresponds to the first optical surface OS1, and the first surface S11 corresponds to the second optical surface OS2. The connection portion CT is, more specifically, a portion that continuously connects the fourth surface S14 and the first surface S11, between which a step is present, to each other and has a connection surface SS, which connects the fourth surface S14 (first optical surface OS1) and the first surface S11 (second optical surface OS2) to each other, as shown in FIG. 2. The connection portion CT, which is formed of the connection surface SS, is so shaped and structured that when a hard coat layer is formed, no liquid drooping occurs on the first optical surface OS1 or the second optical surface OS2 on the video image light incident side, whereby a surface protective hard coat layer can be provided on the light guide member 10, and the light guide member 10 maintains satisfactory performance of introduction of the video image light and visual recognition of outside light. In particular, on the video image light incident side of the light guide device 20, such as the fourth surface S14 and the first surface S11, it is desirable that the amount of liquid drooping is minimized because introduction of video image light requires a high degree of shape precision. On the other hand, the portion between the fourth surface S14 and the first surface S11 has a narrow, constricted shape, that is, a neck-like shape that narrows a flow path of a coating liquid that forms a hard coat, forming a structure that tends to cause liquid drooping. It is therefore very important to appropriately control the coating liquid in the portion described above in the hard coat formation process.

In the light guide device 20, the light guide member 10 is bonded to the light transmissive member 50 via an adhesive layer CC, and a portion formed of the bonding surface of the light guide member 10, the bonding surface of the light transmissive member 50, and the adhesive layer CC is called a bonding portion CN. The formation of a hard coat layer will be described later in detail, and it is assumed now by way of example that after a substrate that is to form the light guide member 10 and a substrate that is to form the light transmissive member 50 are bonded to each other via the bonding portion CN, the bonded substrates are coated in a dipping process (see FIG. 4). That is, a hard coat layer is formed not only on the light guide member 10 but also on the light transmissive member 50 or all over the light guide device 20.

Each of the surfaces that form the light guide member 10 will be described below. The surfaces of the light guide member 10 are configured as follows: The first surface S11 is a flat surface having a local z axis that coincides with a light-exiting-side optical axis AXO parallel to the Z axis; the second surface S12 is a free-form surface having a local z axis that coincides with an optical axis AX1, which is present in a reference plane (cross section in FIG. 2) parallel to the XZ plane and which is inclined to the Z axis; the third surface S13 is a flat surface having a local z axis that coincides with the light-exiting-side optical axis AXO; the fourth surface S14 is a free-form surface having a local z axis that is an optical axis parallel to the bisector of a pair of optical axes AX3 and AX4, which are present in the reference plane described above parallel to the XZ plane and which are inclined to the Z axis; and the fifth surface S15 is a free-form surface having a local z axis that is an optical axis parallel to the bisector of a pair of optical axes AX4 and AX5, which are present in the reference plane described above parallel to the XZ plane and which are inclined to the Z axis. The light-incident-side optical axis AXI is located along an extension of the optical axis AX5 on the side where the fifth surface S15 is present. Each of the first to fifth surfaces S11 to S15 described above has a shape symmetric in a vertical (or upward/downward) Y-axis direction with respect to the reference plane (cross-sectional plane in FIG. 2), which extends horizontally (or rightward/leftward), which is parallel to the XZ plane, and in which the optical axes AX1 to AX5 and other axes extend.

Among the plurality of surfaces that form the light guide member 10, at least one of the free-form surfaces S14 and S15 other than the first surface S11 to the third surface S13 has at least one point where the sign of the curvature varies depending on the direction along the surface. The thus configured free-form surface allows precise control of introduction of video image light and reduction in the size of the light guide member 10.

A main body 10s of the light guide member 10 is made of a resin material showing high light transmittance in the visible region and molded, for example, by injecting a thermoplastic resin material into a die and allowing the injected resin to solidify. The material of the main body 10s can, for example, be a cycloolefin polymer. Although the main body 10s is a unitary molded part, the light guide member 10 can be functionally divided into the first light guide portion 11 and the second light guide portion 12 as described above. The first light guide portion 11 allows guidance and delivery of video image light GL and see-through observation of outside light HL, and the second prism portion 12 allows reception and guidance of the video image light GL.

In the first light guide portion 11, the first surface S11 functions not only as a refractive surface through which the video image light GL exits out of the first light guide portion 11 but also as a total reflection surface that internally totally reflects the video image light GL. The first surface S11 is disposed in front of an eye EY and is a flat surface as described above. The first surface S11 is a surface formed after a hard coat layer 27 is provided on the main body 10s.

The second surface S12 is a surface of the main body 10s, and a half-silvered mirror layer 15 is attached to the surface. The half-silvered mirror layer 15 is a reflective film RM having light transmittance (that is, semi-transmissive/semi-reflective film). The half-silvered mirror layer (semi-transmissive/semi-reflective film) 15 is not formed all over the second surface S12 but is formed on a partial area (not shown) narrower than the second surface S12 primarily in the vertical direction along the Y axis. The half-silvered mirror layer 15 is formed by formation of a metal reflective film or a dielectric multilayer film on the partial area PA of a base surface of the main body 10s. The reflectance of the half-silvered mirror layer 15 at which the video image light GL is reflected ranges from 10% or higher but 50% or lower over an expected range of the angle of incidence of the video image light GL from the viewpoint of readily allowing see-through observation of the outside light HL. The reflectance and transmittance of the half-silvered mirror layer 15 in a specific example at which the video image light GL is reflected and transmitted are set, for example, at 20% and 80%, respectively.

The third surface S13 functions as a total reflection surface that internally totally reflects the video image light GL. The third surface S13 is disposed in front of the eye EY and is a flat surface as the first surface S11 is, and the diopter is zero when the viewer observes the outside light HL having passed through the first surface S11 and the third surface S13 because the first surface S11 and the third surface S13 are parallel to each other, whereby the viewer senses no particular magnification change. The third surface S13 is a surface formed after the hard coat layer 27 is provided on the main body 10s.

In the second light guide portion 12, the fourth surface S14 functions as a total reflection surface that internally totally reflects the video image light GL. The fourth surface S14 also functions as a refractive surface that allows the video image light GL to enter the second light guide portion 12. That is, the fourth surface S14 serves not only as a light incident surface that allows the video image light GL to externally enter the light guide member 10 but also a reflection surface that allows the video image light GL to propagate in the light guide member 10. The fourth surface S14 is a surface formed after the hard coat layer 27 is provided on the main body 10s.

In the second light guide portion 12, the fifth surface S15 is formed by formation of a light reflective film RM made of an inorganic material on a surface of the main body 10s and functions as a reflection surface.

As described above, in the present embodiment, the video image light from the video image display device 82 is guided in the light guide member 10 through reflection five times at the first surface S11 to the fifth surface S15 including total reflection at least twice. The light guidance allows both the display of the video image light GL and the see-through visual recognition of the outside light HL and also allows correction of aberrations associated with the video image light GL.

The light transmissive member 50 is fixed to and integrated with the light guide member 10 to form the light guide device 20, which is a unitary part, as described above. The light transmissive member 50 is a member that assists the see-through function of the light guide member 10 (assistance optical block) and has a first transmissive surface S51, a second transmissive surface S52, and a third transmissive surface S53 as side surfaces having optical functions. The second transmissive surface S52 is disposed between the first transmissive surface S51 and the third transmissive surface S53. The first transmissive surface S51 is a surface that coincides with an extension of the first surface S11 of the light guide member 10. The second transmissive surface S52 is a curved surface bonded to and integrated with the second surface S12 via an adhesive layer CC. The third transmissive surface S53 is a surface that coincides with an extension of the third surface S13 of the light guide member 10. The second transmissive surface S52 and the second surface S12 of the light guide member 10, which are bonded to and integrated with each other via the thin adhesive layer CC, have shapes having substantially the same curvature.

The light transmissive member (assistance optical block) 50 shows high light transmittance in the visible region, and a main body of the light transmissive member 50 is made of a thermoplastic resin material having a refractive index substantially equal to that of the main body 10s of the light guide member 10. The light transmissive member 50 is formed by bonding the main body thereof to the main body 10s of the light guide member 10 and then forming a hard coat on the main body 10s and the main body of the light transmissive member 50 bonded thereto. That is, the light transmissive member 50 has the hard coat layer 27 provided on the main body thereof, as the light guide member 10 does. Each of the first transmissive surface S51 and the third transmissive surface S53 is a surface formed after the hard coat layer 27 is provided on the main body of the transmissive member 50.

The optical path of the video image light GL and other light in the virtual image display apparatus 100 will be described below. The video image light GL outputted from the video image display device (video image device) 82 converges when it passes through the lenses 31 to 33, which form the projection lens 30, receives an intended amount of astigmatism, and impinges on the fourth surface S14, which is a surface of the light guide member 10 and has positive power. The astigmatism is canceled when the video image light GL travels via the surfaces of the light guide member 10, and the video image light in the initial state eventually exits out of the virtual image display apparatus 100 toward the viewer's eye.

The video image light GL having passed through the fourth surface S14 of the light guide member 10 travels while converging and passes through the second light guide portion 12, where the video image light GL is reflected off the fifth surface S15, which has relatively small positive power, and then internally incident again on and reflected off the fourth surface S14.

The video image light GL reflected off the fourth surface S14 of the second light guide portion 12 enters the first light guide portion 11, where the video image light GL is incident on and totally reflected off the third surface S13, which has substantially no power, and the video image light GL is then incident on and totally reflected the first surface S11, which has substantially no power.

The video image light GL forms an intermediate image in the light guide member 10 before or after the video image light GL travels via the third surface S13. An image plane II of the intermediate image corresponds to an image plane OI of the video image display device 82. The image plane II of the intermediate image shown in FIG. 2 is formed in a position on the optical path of the video image light between the third surface S13 and the fourth surface S14 but may instead be formed in a different position in some cases. In the present embodiment, it is assumed that the image plane II is formed in a position on the optical path of the video image light between the third surface S13 and the fifth surface S15.

The video image light GL totally reflected off the first surface S11 is incident on the second surface S12. The video image light GL incident on the half-silvered mirror layer 15, in particular, partially passes through the half-silvered mirror layer 15 and is partially reflected off the half-silvered mirror layer 15. The partially reflected video image light GL is then incident on the first surface S11 again and passes therethrough. The half-silvered mirror layer 15 acts as a component having relatively large positive power acting on the video image light GL to be reflected off the half-silvered mirror layer 15. The first surface S11 acts, on the other hand, as a component having no refractive power acting on the video image light GL passing through the first surface S11.

The video image light GL having passed through the first surface S11 forms a substantially parallelized light flux and impinges on the pupil of the viewer's eye EY or a position equivalent to the pupil. That is, the video image light GL in the form of a virtual image allows the viewer to observe an image formed on the video image display device (video image device) 82.

On the other hand, a portion of the outside light HL that is incident on the light guide member 10 in an area next to the second surface S12 on the +X side passes through the third surface S13 and the first surface S11 of the first light guide portion 11. In this process, substantially no aberration is produced or other unwanted optical phenomena occur because the third surface S13 and the first surface S11 are flat surfaces substantially parallel to each other. That is, the viewer observes through the light guide member 10 a distortion-free image formed by the outside light. Further, a portion of the outside light HL that is incident on the light guide member 10 in an area next to the second surface S12 on the −X side, that is, a portion of the outside light HL that is incident on the light transmissive member 50 passes through the third transmissive surface S53 and the first transmissive surface S51 of the light transmissive member 50. In this process as well, substantially no aberration is produced or other unwanted optical phenomena occur because the third transmissive surface S53 and the first transmissive surface S51 are flat surfaces substantially parallel to each other. That is, the viewer observes through the light transmissive member 50 a distortion-free image formed by the outside light. Further, a portion of the outside light HL that is incident on a portion of the light transmissive member 50 that corresponds to the second surface S12 of the light guide member 10 passes through the third transmissive surface S53 and the first surface S11. In this process as well, substantially no aberration is produced or other unwanted optical phenomena occur because the third transmissive surface S53 and the first surface S11 are flat surfaces substantially parallel to each other. That is, the viewer observes through the light transmissive member 50 an image that is formed by the outside light and is not greatly distorted. The second surface S12 of the light guide member 10 and the second transmissive surface S52 of the light transmissive member 50 have substantially the same curved shape and substantially the same refractive index, and the gap between the two surfaces is filled with the adhesive layer CC having a refractive index substantially equal to those of the light guide member 10 and the light transmissive member 50. That is, neither the second surface S12 of the light guide member 10 nor the second transmissive surface S52 of the light transmissive member 50 acts as a refractive surface on the outside light HL.

However, since the outside light HL incident on the half-silvered mirror layer 15 partially passes through the half-silvered mirror layer 15 and is partially reflected off the half-silvered mirror layer 15 at the same time, the outside light HL oriented in the direction corresponding to the half-silvered mirror layer 15 is attenuated in accordance with the transmittance of the half-silvered mirror layer 15. On the other hand, since the video image light GL traveling in the direction corresponding to the half-silvered mirror layer 15 is incident on the viewer's eye, the viewer observes an image formed by the outside light as well as the image formed on the video image display device (video image device) 82 in the direction of the half-silvered mirror layer 15.

The video image light GL having propagated through the light guide member 10 and impinged on the second surface S12 but not having been reflected off the half-silvered mirror layer 15 enters the light transmissive member 50, but an antireflection portion (not shown) provided in the light transmissive member 50 prevents the incident video image light from returning into the light guide member 10. That is, the video image light GL having passed through the second surface S12 is not allowed to return back along the optical path or form stray light. Further, the outside light HL incident through the light transmissive member 50 and reflected off the half-silvered mirror layer 15 returns into the light transmissive member 50, but the antireflection portion (not shown) provided in the light transmissive member 50 described above prevents the outside light from entering the light guide member 10. That is, the outside light HL reflected off the half-silvered mirror layer 15 is not allowed to return back along the optical path or form stray light.

In the virtual image display apparatus 100 having the see-through configuration described above, in which an exposed portion that transmits light occupies a large area, it is more important than an ordinary virtual image display apparatus to provide the surfaces of the light guide member 10 and the light transmissive member 50 with the hard coat layer for maintaining satisfactory see-through performance. Each of the light guide member 10 and the light transmissive member 50, however, has a complicated shape as described above, and it is not always easy, for example, to fully coat the light guide portions of the light guide member 10. Specifically, when the hard coat layer 27 is formed on a substrate that is to form the light guide member 10 or the light transmissive member 50, it is conceivable that a coating liquid that is a raw material of the hard coat layer 27 undesirably causes liquid drooping in an unintended portion. In the present embodiment, among portions between the plurality of optical surfaces that form the light guide member 10, that is, portions where the coating liquid particularly tends to cause liquid drooping, the connection portion CT is provided particularly at a portion between the surfaces on the video image light incident side and allowed to function as a structure that controls the flow of the coating liquid (flow control structure), whereby liquid drooping will not occur and the hard coat layer 27 can be formed in a satisfactory state.

Figures 3A, 3B:
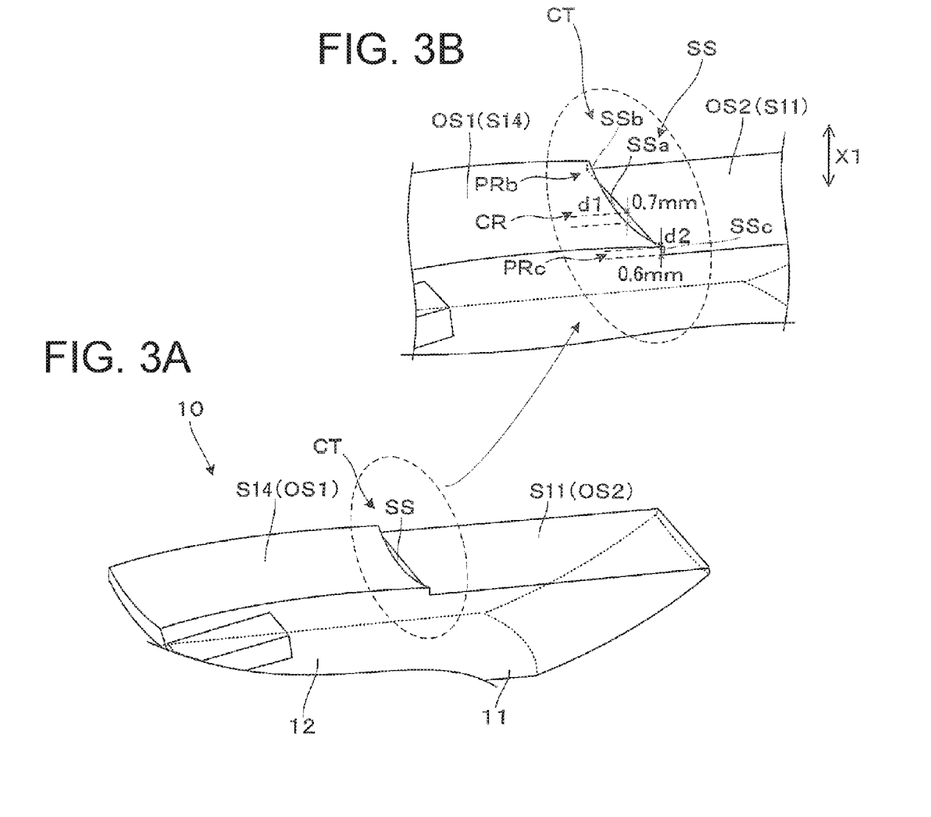
Figure 3C:
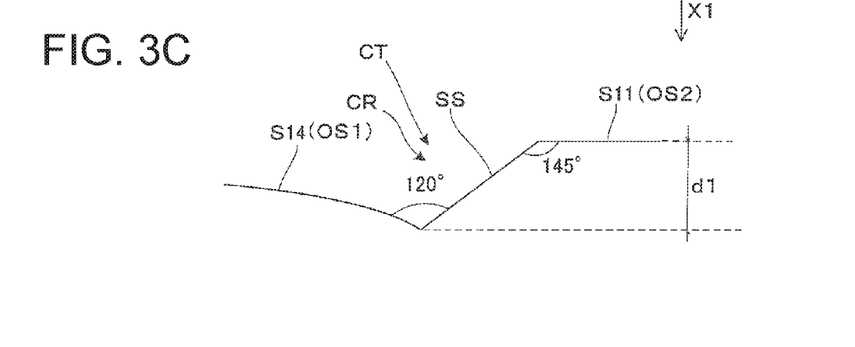
FIG. 3C conceptually shows a cross section of the connection portion.

The connection portion CT provided in the light guide member 10 will be described below in detail with reference to FIGS. 3A to 3C. FIG. 3A is a perspective view conceptually showing an example of the shape of the connection portion CT provided between the fourth surface S14, which is the first optical surface OS1 of the light guide member 10, and the first surface S11, which is the second optical surface OS2 of the light guide member 10. FIG. 3B is an enlarged view of part of FIG. 3A. FIG. 3C conceptually shows a cross section of the connection portion CT.

First, the first optical surface OS1 (fourth surface S14) and the second optical surface OS2 (first surface S11) are optical surfaces adjacent to each other with a height difference (or a step) therebetween, as shown in FIG. 3A. From a different point of view, it can be said that the connection portion CT is a member that connects the optical surfaces of the light guide member 10 that have a height difference to each other, that is, the optical surface of the first light guide portion 11 and the optical surface of the second light guide portion 12 to each other. As described above, the first surface S11, which is the second optical surface OS2, is a flat surface, whereas the fourth surface S14, which is the first optical surface OS1, is a free-form surface and hence has a complicated shape. The connection portion CT also has a complicated shape accordingly. Specifically, in a central portion CR at the center of the connection portion CT, that is, in the vicinity of a reference plane SR (see FIG. 2), the second optical surface OS2 (first surface S11) protrudes from the first optical surface OS1 (fourth surface S14) to form a partial surface SSa of the connection surface SS, as shown in the enlarged view of FIG. 3B. On the other hand, in peripheral portions PRb and PRc at the periphery of the connection portion CT, that is, in positions set apart from the reference plane SR (see FIG. 2), the first optical surface OS1 (fourth surface S14) protrudes from the second optical surface OS2 (first surface S11) to form partial surfaces SSb and SSc of the connection surface SS. That is, the height difference is non-uniform (is not uniform). The partial surfaces SSa, SSb, and SSc, which form the connection surface SS, correspond to the height difference of the step between the two optical surfaces OS1 and OS2 adjacent to each other. It is now assumed that the size (dimension) of the height difference is defined in terms of the width in a direction X1 perpendicular to the second optical surface OS2 (first surface S11), which is a flat surface, by way of example. Based on the definition, a maximum height difference d1 along the partial surface SSa is 0.7 mm, and a maximum height difference d2 along the partial surfaces SSb and SSc is 0.6 mm. In other words, the connection portion CT is so shaped and structured that the height difference between the second optical surface OS2 and the first optical surface OS1, that is, the step between the first surface S11 and the fourth surface S14 is 1 mm or smaller over the connection surface SS. The shape and structure can prevent liquid drooping from occurring over the region from the first optical surface OS1 to the second optical surface OS2 in the formation of the hard coat layer 27, which will be described later. It is noted that the definition of the size of the height difference (step) can be more generalized than in the example described above. For example, a flat plane tangential to one of the optical surfaces in the vicinity of the connection portion CT is set as appropriate, and the non-uniform height difference can be defined in the direction perpendicular to the tangential plane. Providing the non-uniform height difference as described above allows adjustment of flow of the coating liquid in the formation of the hard coat layer 27. For example, in the case described above, the maximum height difference d1 along the partial surface SSa is 0.7 mm, and the maximum height difference d2 along the partial surfaces SSb and SSc is 0.6 mm, which means that it is conceivable that the step could, for example, be as large as about 1.3 mm. In contrast, in the present embodiment, creating the non-uniform height difference between the first optical surface OS1 and the second optical surface OS2 as described above substantially reduces the size of the step. The configuration prevents the coating liquid from building up and forming a liquid pool, for example, in the portion between the first optical surface OS1 and the second optical surface OS2 in the formation of the hard coat layer 27.

FIG. 3C conceptually shows a cross section of the connection portion CT taken along the reference plane SR (see FIG. 2). As shown in FIG. 3C, the connection surface SS of the connection portion CT, which continuously connects the first optical surface OS1 and the second optical surface OS2 to each other, is particularly connected to the first optical surface OS1 and the second optical surface OS2 at obtuse angles of 120° or greater with respect thereto. For example, in FIG. 3C, the angle between the connection surface SS and the first optical surface OS1 in the central portion CR is 120°, and the angle between the connection surface SS and the second optical surface OS2 in the central portion CR is 145°. As a result, in the region from the first optical surface OS1 to the second optical surface OS2, no stepped portion is formed at an acute angle with respect to the optical surfaces, whereby liquid drooping is also suppressed in this regard.

Figure 4:
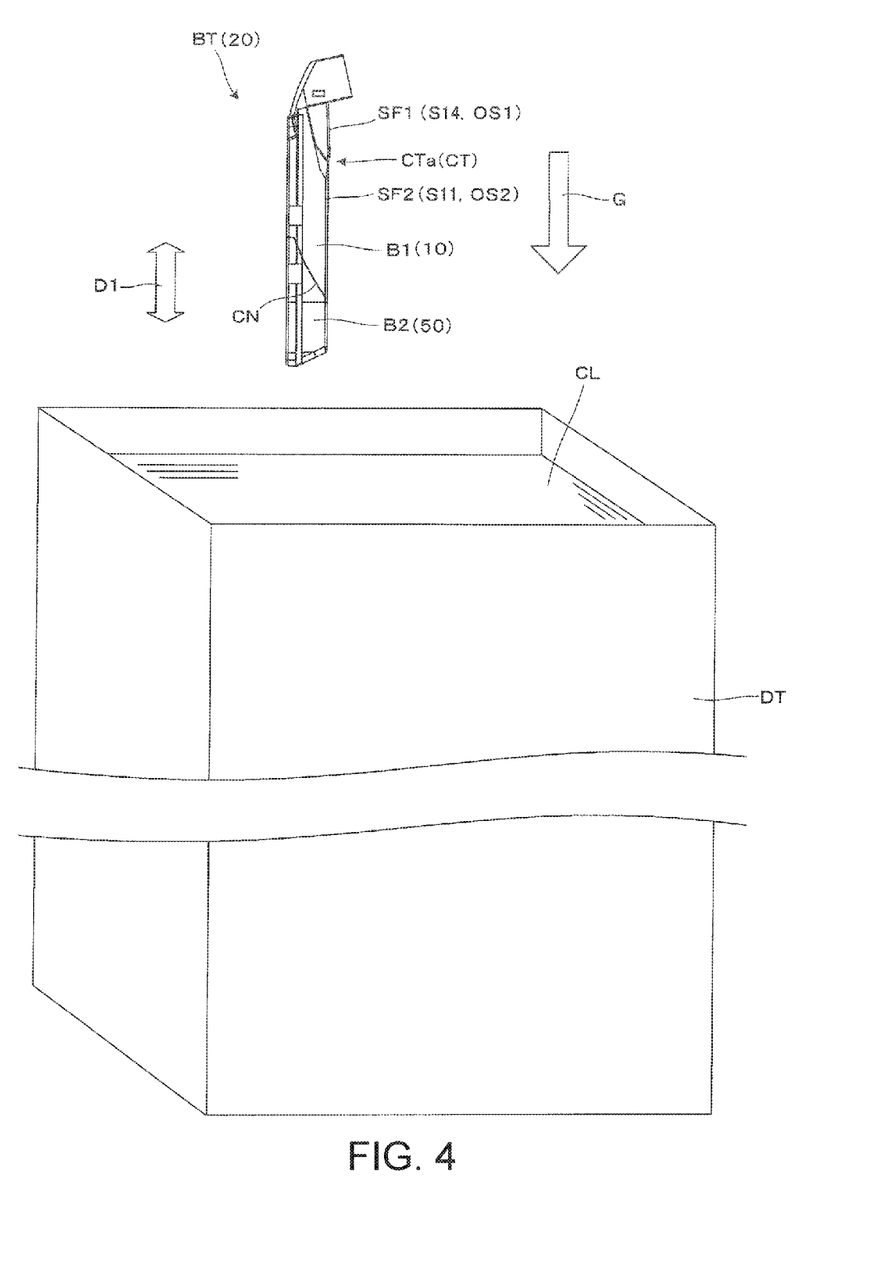
FIG. 4 shows a dipping process for hard coating.

The configuration of the light guide device 20 of the virtual image display apparatus 100 and a dipping process step of applying the coating liquid (coating liquid application step) among the steps of manufacturing the light guide device 20 will be described below with reference to FIG. 4. FIG. 4 shows the procedure of the manufacturing method and specifically shows a state before the optical surface OS1 and other surfaces are formed. In FIG. 4, however, among the surfaces of a substrate BT, for example, surfaces SF1 and SF2, which are to be the optical surfaces OS1 and OS2, are simply labeled with the optical surfaces OS1 and OS2, and a portion CTa corresponding to the connection portion CT is simply labeled with the connection portion CT for ease of description.

In FIG. 4, the substrate BT is a member that is to form the light guide device 20 when hard coated and is a combination of a first substrate B1, which is to form the light guide member 10, and a second substrate B2, which is to form the light transmissive member 50, bonded to each other via the bonding portion CN. As shown in FIG. 4, the substrate BT, specifically, a portion thereof in an attachment position on the light incident side is fixed to and hung from a fixture (not shown), and a processing tank DT filled with a coating liquid CL is prepared. The substrate BT fixed to and hung from the fixture is moved upward and downward in the direction indicated by the arrow D1 (direction along gravitational direction G) to allow formation of the hard coat layer 27. One of the two directions indicated by the arrow D1, that is, the direction opposite to the gravitational direction G is called a dipping lift-up direction or simply called a lift-up direction. The substrate BT is first brought down in the gravitational direction G, which is one of the directions indicated by the arrow D1, dipped in the coating liquid CL with which the processing tank DT is filled, and then lifted up in the lift-up direction, that is, in the direction opposite to the gravitational direction G. The coating liquid C1 is thus applied onto the surface of the substrate BT (coating liquid application step).

Figure 5A:
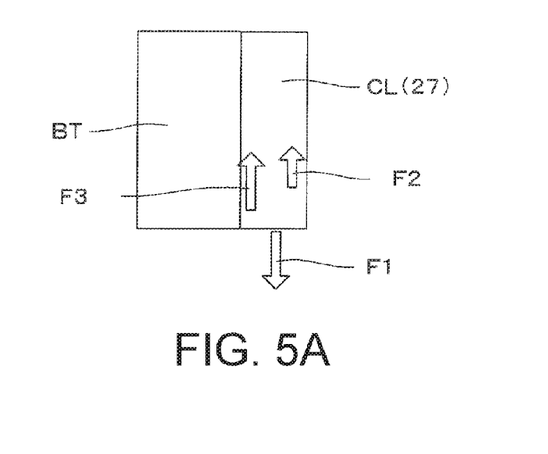
FIG. 5A describes flow of a coating liquid after a dipping process, and FIG. 5B describes a case where liquid drooping occurs.

The coating liquid CL applied onto the surface of the substrate BT in the coating liquid application step described above flows along the surface of the substrate BT, for example, under a gravitational force F1 and against a viscosity force F2 and a surface tension F3 of the coating liquid CL to cover the surface of the substrate BT, as shown in FIG. 5A. The coating liquid CL having covered the surface is then dried to form the hard coat layer 27 (layer formation step). In the layer formation step, a layer is formed also on a portion that is to form the portion from the first optical surface OS1 to the second optical surface OS2. In the layer formation described above, the attitude of the substrate BT is so set with respect to the gravitational direction G that the surface SF1, which is to form the first optical surface OS1, is located above the portion CTa, which is to form the connection portion CT, and the surface SF2, which is to form the second optical surface OS2, is located below the portion CTa, which is to form the connection portion CT. In this case, the coating liquid CL flows as a whole under gravity from the first optical surface OS1 via the connection portion CT (more correctly, portion CTa, which is to form connection portion CT) toward the second optical surface OS2.

Figure 5B:
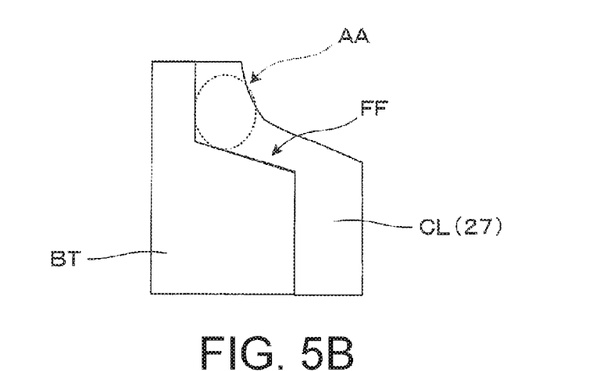

A mechanism in accordance with which liquid drooping occurs in a dipping-based hard coating process will be described with reference to FIGS. 5A and 5B. First, the coating liquid CL having adhered to the substrate in the dipping method described above is applied onto the substrate to a certain fixed thickness under the condition that the gravitational force F1, the viscosity force F2 and the surface tension F3 of the coating liquid CL, and other forces are balanced as a whole, as shown in FIG. 5A. When an external force, such as an inertia force due to airflow and motion of the substrate BT, acts on the coating liquid CL, the relationship among the forces described above goes out of balance, and the coating liquid CL flows to a specific location. Assuming that the substrate BT has a shape having a stepped surface FF substantially perpendicular to the gravitational direction G, the coating liquid CL flows in such a way that it builds up in an area AA of the stepped surface FF, resulting in liquid drooping, as shown in FIG. 5B. In contrast, in the present embodiment, a portion similar to the stepped surface FF shown in FIG. 5B is not allowed to be formed so that the flow of the coating liquid CL can be adequately controlled in the hard coating process, whereby the hard coat layer 27 can be formed in a satisfactory state. That is, as shown in FIG. 3C, the connection surface SS, which forms the connection portion CT, is connected to each of the first optical surface OS1 and the second optical surface OS2 at an angle greater than or equal to 120°, and the step between the first optical surface OS1 and the second optical surface OS2 is not allowed to be greater than or equal to 1 mm. That is, the size of the step is reduced to prevent formation of a liquid pool in the formation of the connection portion CT. Further, the connection portion CT functions as a prevention structure, an escape groove, or a flow changing structure for preventing unevenness or other defects due to the coating liquid CL that builds up or droops on the first optical surface OS1 and the second optical surface OS2. As a result, in each step of forming the hard coat layer 27, the coating liquid CL is so controlled that no liquid pool is formed when the coating liquid CL flows. In particular, in the layer formation step, the coating liquid CL having flowed from the upper side, that is, the first optical surface OS1 is not allowed to cause liquid drooping on the second optical surface OS2. As a result, the coating liquid CL will not build up or otherwise stay at an unintended location, whereby a satisfactory field of view can be provided in the see-through observation.

As described above, in the present embodiment, the light guide member 10 and the light transmissive member 50 bonded to each other in the light guide device 20 allows see-through observation in which the video image light GL and the outside light HL are superimposed on each other. In particular, in the connection portion CT, which is disposed in a portion located on the video image light incident side, where it is necessary to prevent liquid drooping, and having a narrow-neck-shaped structure that tends to cause liquid drooping, the size of the step formed between the optical surfaces OS1 and OS2 is limited to 1 mm or smaller, so that no large stepped portion is present in the connection portion CT in the hard coat formation process, whereby the coating liquid CL that flows along the portion that is to form the optical surfaces OS1 and OS2 will not build up or droop. The light guide device 20 can thus maintain satisfactory light guiding performance in the light guide portions.

Further, in the virtual image display apparatus 100 described above, forming the first surface S11 and the third surface S13 of the light guide member 10 to be flat and in substantially parallel to each other allows a diopter error associated with the outside light to be substantially zero, whereby an apparent magnification error, in particular, can be substantially zero and a naked-eye-equivalent state can therefore be achieved. The magnification error refers to an error that causes an image formed by outside light and viewed through a light transmissive member, such as the light guide member, to be larger or smaller than the size of the actual image formed by the outside light. Outside light viewed through a light transmissive member is more or less accompanied by a magnification error because the member has a curved surface having finite curvature and due to influences of the thickness, the refractive index, and other factors, unless the member has completely flat surfaces. In the light guide member 10, the first surface S11 and the third surface S13, each of which is a flat surface, cause no apparent magnification error.

Moreover, in the virtual image display apparatus 100 according to the present embodiment, the projection lens 30 and other components form an intermediate image in the light guide member 10, and the video image light GL sequentially totally reflected off at least two surfaces out of the third surface S13, the first surface S11, and the second surface S12 passes through the first surface S11 and reaches the viewer's eye EY, whereby the light guide member 10, which extends, for example, only sideways, can be thin so that the entire optical system is compact and lightweight with wide-angle, bright, high-performance display achieved. Further, the outside light HL is allowed to pass through, for example, the first surface S11 and the third surface S13 for observation. In this process, since the diopter is substantially zero, the degree of defocus and distortion of the outside light HL can be reduced when the outside light HL is recognized in the see-through observation. Moreover, the light guide member 10 can be so shaped that it follows the viewer's face and the center of gravity of the light guide member 10 can be placed in a position close to the face for excellent exterior appearance. In particular, each of the fourth surface S14 and other surfaces other than the first surface S11 and the third surface S13 is a curved surface having a point where the curvature varies depending on the direction along the surface, whereby the size of the light guide member 10 and hence the size and weight of the entire virtual image display apparatus 100 can be reduced.

Figure 6:
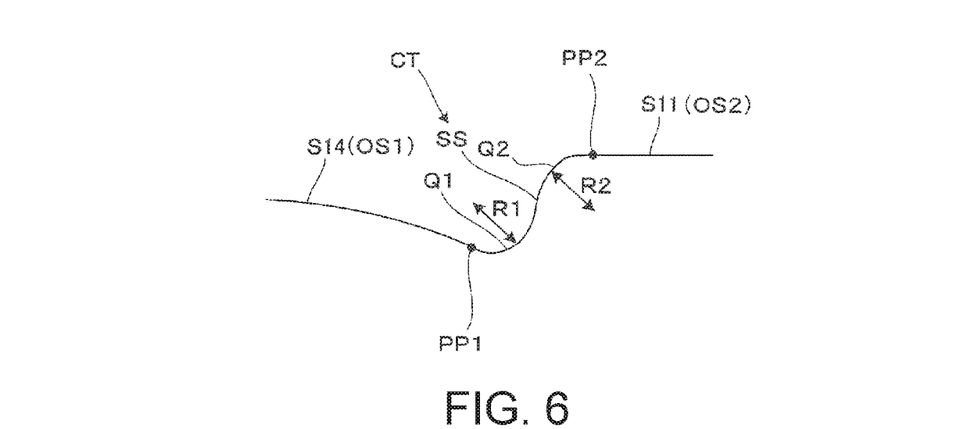
FIG. 6 is a cross-sectional view conceptually showing another example of the connection portion.

FIG. 6 describes a variation of the light guide device and is a cross-sectional view conceptually showing another example of the structure of the connection portion CT. FIG. 6 corresponds to FIG. 3C, and portions other than that shown in FIG. 6 will not be illustrated or described because the other portions remain unchanged. Further, in FIG. 6, portions having the same reference symbols as those in FIG. 3C will not be described. In the example shown in FIG. 6, the shape of the connection surface SS of the connection portion CT differs from that in FIG. 3C. Specifically, first of all, the connection surface SS has a curved shape and smoothly connects the first optical surface OS1 and the second optical surface OS2 to each other. It is assumed in the description that the connection surface SS is connected to the first optical surface OS1 at a first base point PP1 and to the second optical surface OS2 at a second base point PP2. It is further assumed that the connection surface SS has a radius of curvature R1 of at least 1 mm in a first curved surface portion Q1, which extends from the first base point PP1, and has a radius of curvature R2 of at least 1 mm in a second curved surface portion Q2, which extends from the second base point PP2. That is, each of the curved surface portions Q1 and Q2 is a surface having relatively moderate curvature. The first curved surface portion Q1 and the second curved surface portion Q2 are also smoothly connected to each other. Preventing formation of a surface having sharp curvature as described above also prevents liquid drooping from occurring.

Figure 7A:
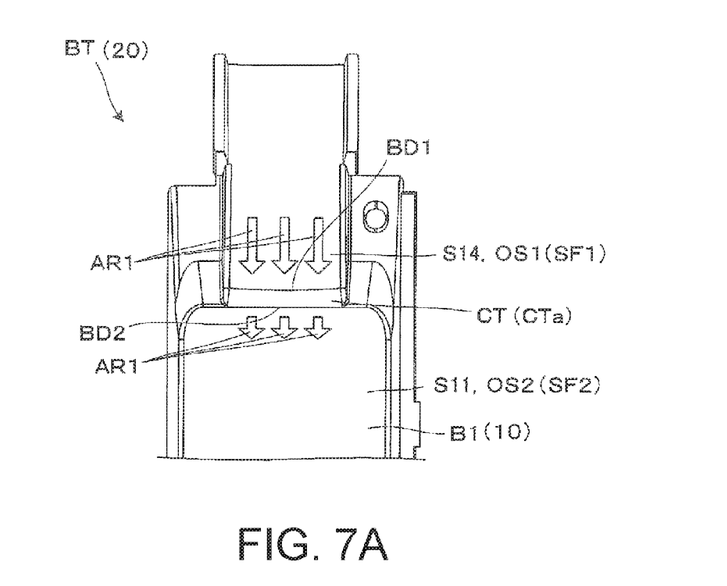
FIG. 7A shows an example of a connection line that is the boundary between a connection surface and an optical surface.
Figure 7B:
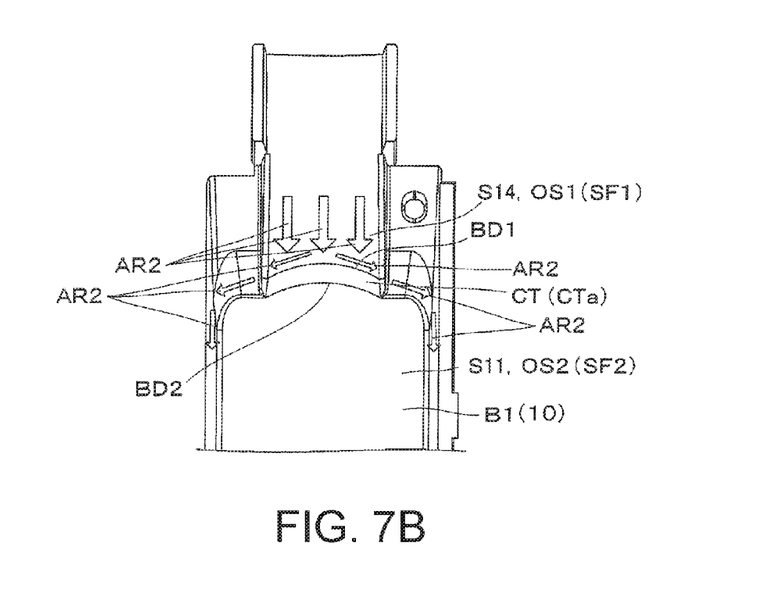
FIG. 7B shows another example of the connection line that is the boundary between a connection surface and an optical surface.

FIG. 7A describes still another example of the light guide device and shows the flow of the coating liquid in the hard coat formation step. In each of the examples described above, characteristics of the cross-sectional shape of the connection portion CT have been described, and in this example, a description will be made of characteristics of connection lines BD1 and BD2, which are the boundaries between the connection surface SS of the connection portion CT and the optical surfaces OS1, OS2. FIG. 7A and FIG. 7B, the latter of which will be described later, show the procedure of the manufacturing method and specifically show a state before the optical surface OS1 and other surfaces are formed. In FIGS. 7A and 7B, among the surfaces of the substrate BT, for example, surfaces that are to be the optical surfaces OS1 and OS2 are simply labeled with the optical surfaces OS1 and OS2 and other reference symbols.

In the example shown in FIG. 7A, each of the connection line BD1 between the connection surface SS and the first optical surface OS1 and the connection line BD2 between the connection surface SS and the second optical surface OS2 is a straight line. In this case, when the connection portion CT has, in the cross-sectional view, a structure that allows the coating liquid CL to smoothly flow without formation of a pool of the coating liquid CL as described above, the coating liquid CL primarily flows from the first optical surface OS1 toward the second optical surface OS2 in a substantially uniform manner in the layer formation step as indicated by the arrows AR1, whereby formation of a liquid pool due to the presence of the connection lines BD1 and BD2 is suppressed and hence liquid sagging is suppressed.

The connection lines BD1 and BD2 can instead be so shaped that they have no inflection point, as shown as still another example in FIG. 7B. More specifically, in FIG. 7B, the connection lines BD1 and BD2 are so shaped that they are convex upward and gently curved in a horizontally symmetric manner with respect to the reference place SR (see FIG. 2). It is noted that each of the connection lines BD1 and BD2, which are curved surfaces extending rightward and leftward, has a shape with no inflection point. The inflection point used herein is a point where the direction in which each of the connection lines BD1 and BD2 flexes changes in FIG. 7B or in a plan view of the connection lines BD1 and BD2. In other words, the inflection point is a point where the shape of each of the connection lines BD1 and BD2 transitions from an upward convex shape to a downward convex shape. Each of the connection lines BD1 and BD2 shown in FIG. 7B, which has an upward convex shape in the vicinity of the center thereof, that is, in the position of the reference plane SR (see FIG. 2), maintains the shape, and the upward convex shape does not transition to the downward convex shape. In this case, in the layer formation step, the amount of coating liquid CL that does not travels from the first optical surface OS1 toward the second optical surface OS2 but flows sideways as indicated by the arrows AR2 increases so that the coating liquid CL is not allowed to form a liquid pool in the course of the flow. It is noted that even when part of the coating liquid CL that flows sideways droops to some extent on the side surfaces that do not contribute to the optical performance, the introduction and other types of optical manipulation of the video image light are not greatly affected.

Figure 8:
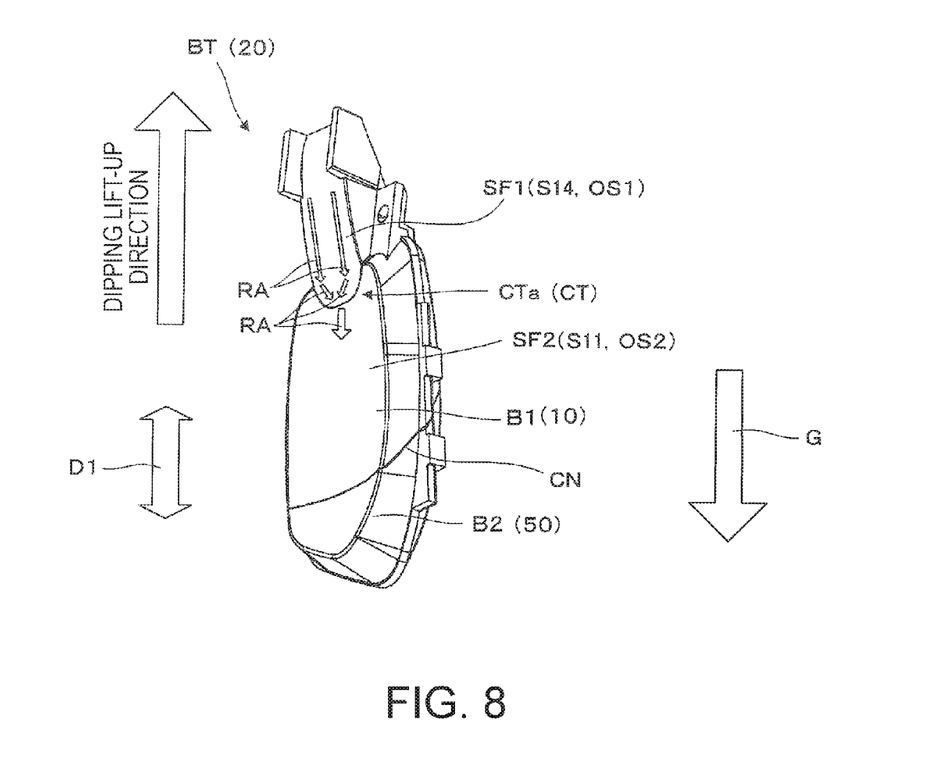
FIG. 8 shows an example of a light guide device having a different shape.

FIG. 8 shows an example of the light guide device having a shape different from those described above. FIG. 8 shows a case where the first surface S11 (that is, second optical surface OS2) is also a free-form surface as well as the fourth surface S14 (that is, first optical surface OS1). Also in the thus shaped light guide device, for example, when the substrate is lifted up in the dipping lift-up direction shown in FIG. 8, the coating liquid flows in the direction indicated by the arrows RA to the portion between the first optical surface OS1 and the second optical surface OS2, possibly resulting in liquid drooping. In contrast, forming the connection portion CT that satisfies the conditions described above allows satisfactory formation of the hard coat layer 27 even in a case where each of the first optical surface OS1 and the second optical surface OS2 is a curved surface. That is, not only in the case where the first surface S11 and the third surface S13 are flat surfaces substantially parallel to each other but also in the case where the first surface S11 and the third surface S13 are curved surfaces, liquid sagging can be appropriately suppressed.

Others

The invention has been described with reference to the above embodiment, but the invention is not limited to the embodiment described above, and a variety of aspects of the invention can be implemented to the extent that they do not depart from the substance of the invention. For example, the following variations are conceivable.

In the embodiment described above, the hard coat layer 27 is formed in a dipping process, but the layer formation method is not limited to the dipping process and can be any process that allows the connection portion CT (portion CTa corresponding to connection portion CT) to function as a prevention structure, an escape groove, or any other mechanism that causes the coating liquid CL to form the hard coat layer 27 of a predetermined thickness so that the precision of each of the optical surfaces can be maintained. For example, the layer formation method can be a typical coating method, spraying method, spin coating method, roll coating method, and wet or dry coating method.

In the above description, the projection lens has one nonaxisymmetric aspheric surface but can have two or more nonaxisymmetric aspheric surfaces.

In the above description, the half-silvered mirror layer (semi-transmissive/semi-reflective film) 15 is formed in a laterally elongated rectangular area. The contour of the half-silvered mirror layer 15 can be changed as appropriate in accordance with an application of interest and other usages. Further the transmittance and reflectance of the half-silvered mirror layer 15 can be changed in accordance with an application of interest and other usages.

In the above description, the luminance distribution of an image displayed on the video image display device 82 is not particularly adjusted. When the luminance varies position to position, for example, the luminance distribution of a displayed image can be nonuniformly adjusted.

In the above description, the image display section 80 includes the video image display device 82 formed, for example, of a transmissive liquid crystal display device. The image display section 80 does not necessarily include the video image display device 82 formed, for example, of a transmissive liquid crystal display device and can instead include a video image display device 82 formed of any other device. For example, the video image display device 82 can be formed of a reflective liquid crystal display device, or the video image display device 82 formed, for example, of a liquid crystal display device can be replaced, for example, with a video image display device 82 formed of a digital micromirror device. Further, the image display section 80 can include a self-luminous device, representative examples of which include an LED array and an OLED (Organic Light Emitting Diode) array.

In the embodiment described above, the image display section 80 formed, for example, of a transmissive liquid crystal display device is used. The image display section 80 can be replaced with a scan-type image display section.

In the embodiment described above, the light guide member 10 and the light transmissive member 50, the latter of which is an assistance optical block, cover the entire area in front of the wearer's eye EY, but the entire front area is not necessarily covered. A compact configuration in which a portion including the second surface S12, which has a curved shape and on which the half-silvered mirror layer 15 is formed, covers only part of the area in front of the eye EY, that is, part of the area in front of the eye is covered but the other portions are not covered may be employed.

The above description has been made of the virtual image display apparatus 100 including a pair of display units 100A and 100B, and the pair of display units 100A and 100B can be replaced with a single display unit. That is, instead of providing each of the right and left eyes with a set of the projection and see-through section 70 and the image display section 80, only one of the right and left eyes may be provided with the projection and see-through section 70 and the image display section 80 for monocular image observation.

In the above description, the half-silvered mirror layer 15 is a simple semi-transmissive film (metal reflection film or dielectric multilayer film, for example), and the half-silvered mirror layer 15 can be replaced with a flat-surface or curved-surface hologram element.

In the above description, the light guide member 10 and other components extend in the horizontal direction along which the eyes EY are arranged. The light guide member 10 and other components can instead be so disposed that it extends in the vertical direction. In this case, the light guide member 10 has a structure in which the light guide member 10 and other components are not disposed in series but are disposed in parallel.

The entire disclosure of Japanese Patent Application No. 2013-265008, filed Dec. 24, 2013 is expressly incorporated by reference herein.

What is claimed is:
1. A light guide device comprising:
a light guide member that has a plurality of optical surfaces including a curved surface, that introduces a light into the light guide device, and that guides the light through internal reflection to cause the light to exit out of the light guide device; and
a hard coat layer that is formed on at least a part of the plurality of optical surfaces of the light guide member, wherein
the light guide member has a connection portion that connects, among the plurality of optical surfaces, a first optical surface and a second optical surface to each other,
the connection portion includes a center partial surface between the first and second optical surfaces along a center plane of the connection portion that has a different maximum height than at least one periphery partial surface between the first optical surface and the second optical surface along a periphery of the connection portion, the connection portion has a connection surface that continuously connects the first optical surface and the second optical surface to each other, and the connection surface is a curved surface that smoothly connects the first optical surface and the second optical surface to each other.

2. The light guide device according to claim 1, wherein the first optical surface and the second optical surface are adjacent to each other with a step having a size of 1 mm or smaller there between.

3. The light guide device according to claim 1, wherein the connection surface is connected to each of the first optical surface and the second optical surface at an angle greater than or equal to 120°.

4. The light guide device according to claim 1, wherein the connection surface includes a curved surface portion having a radius of curvature of 1 mm or greater.

5. The light guide device according to claim 1, wherein a first connection line that is the boundary between the connection portion and the first optical surface and a second connection line that is the boundary between the connection portion and the second optical surface have no inflection point.

6. The light guide device according to claim 1, wherein a first connection line that is the boundary between the connection portion and the first optical surface and a second connection line that is the boundary between the connection portion and the second optical surface each have a linear shape.

7. The light guide device according to claim 1, wherein the curved surface is nonaxisymmetric.

8. The light guide device according to claim 1, wherein the light guide member has at least two nonaxisymmetric curved surfaces as the plurality of optical surfaces and serves as part of an optical system to form an intermediate image.

9. The light guide device according to claim 1, wherein
in the light guide member, a first surface and a third surface among the plurality of optical surfaces are so disposed that the first surface and the third surface face each other, the light from an image device is reflected off the third surface, is reflected off the first surface, is reflected off a second surface, then passes through the first surface, and reaches an observation side, and
one of the first surface to the third surface is the first optical surface or the second optical surface.

10. A light guide device comprising:
a light guide member that has a plurality of optical surfaces including a curved surface, that introduces a light into the light guide device, and that guides the light through internal reflection to cause the light to exit out of the light guide device; and
a hard coat layer that is formed on at least a part of the plurality of optical surfaces of the light guide member, wherein
the light guide member has a connection portion that connects, among the plurality of optical surfaces, a first optical surface and a second optical surface to each other,
the connection portion includes a center partial surface between the first and second optical surfaces along a center plane of the connection portion that has a different maximum height than at least one periphery partial surface between the first optical surface and the second optical surface along a periphery of the connection portion, and
the light guide member has at least five surfaces as the plurality of optical surfaces, and at least three surfaces of the plurality of optical surfaces are nonaxisymmetric curved surfaces.

11. A light guide device comprising:
a light guide member that has a plurality of optical surfaces including a curved surface, that introduces a light into the light guide device, and that guides the light through internal reflection to cause the light to exit out of the light guide device;
a light transmissive member that is bonded to the light guide member and allows visual recognition of outside light and the light superimposed on each other; and
a hard coat layer that is formed on at least a part of the plurality of optical surfaces of the light guide member, wherein
the light guide member has a connection portion that connects, among the plurality of optical surfaces, a first optical surface and a second optical surface to each other, and
the connection portion includes a center partial surface between the first and second optical surfaces along a center plane of the connection portion that has a different maximum height than at least one periphery partial surface between the first optical surface and the second optical surface along a periphery of the connection portion.

12. A virtual image display apparatus comprising:
an image device that generates an image light; and
the light guide device according to claim 1 that guides the image light from the image device through internal reflection.

* * * * *